US012625795B1

(12) United States Patent　　　　(10) Patent No.: US 12,625,795 B1

Hornsby et al.　　　　　　　　　　　(45) Date of Patent: May 12, 2026

(54) FAULT INJECTION LOAD TESTING

(71) Applicant: Amazon Technologies, Inc., Seattle, WA (US)

(72) Inventors: Adrian John Hornsby, Espoo (FI); Serafin Antonio Sedano Arenas, B (ES)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 18/126,946

(22) Filed: Mar. 27, 2023

(51) Int. Cl.
G06F 11/3668 (2025.01)

(52) U.S. Cl.
CPC ...... G06F 11/3688 (2013.01); G06F 11/3692 (2013.01)

(58) Field of Classification Search
CPC .. G06F 11/3688; G06F 11/3692; H04L 43/50; H04L 43/55
See application file for complete search history.

(56) References Cited

U.S. PATENT DOCUMENTS

| | | | |
|---|---|---|---|
| 9,558,465 B1 * | 1/2017 | Arguelles | G06F 11/263 |
| 11,010,233 B1 * | 5/2021 | Golden | G06F 21/554 |
| 11,381,663 B1 * | 7/2022 | Vega | G06F 9/541 |
| 11,722,360 B2 * | 8/2023 | Di Martino | H04L 43/50 |
| 2023/0106929 A1 * | 4/2023 | Saha | G06F 11/3688 |
| | | | 717/124 |
| 2023/0325272 A1 * | 10/2023 | Golden | G06F 21/64 |
| | | | 714/47.2 |
| 2024/0227825 A1 * | 7/2024 | Aneja | G06F 11/2284 |

* cited by examiner

*Primary Examiner* — Philip Guyton
*Assistant Examiner* — Sean Kevin McNamara
(74) *Attorney, Agent, or Firm* — Knobbe Martens Olson & Bear LLP

(57) ABSTRACT

Disclosed are various embodiments for performing fault injection tests on services, systems, or applications while they are under load. First, a load level for an application is identified. Then, load traffic is sent to the application, wherein the load traffic causes the application to operate at the load level. Then, a fault injection test is performed on the application while the application is at the load level.

20 Claims, 4 Drawing Sheets

200

153

147

Start

Receive Load Level and Test
Environment Identifier                    403

Generate Load Traffic                     406

Send Load Traffic to Test
Environment                               409

Receive Halt Instruction                  413

Halt Load Traffic                         413

End

FAULT INJECTION LOAD TESTING

BACKGROUND

Chaos engineering is a term used to describe approaches to testing the resiliency of computer systems in the face of unexpected external conditions. Chaos engineering may include intentionally introducing unexpected or unplanned faults into a system to determine how the system will react in response to the fault. The results of such experiments can then be evaluated to determine whether the system can provide an adequate quality of service, or any service at all, when faced with unexpected or unplanned faults. For example, chaos engineering principles can be used to verify that a redundant system architecture provides an acceptable level of service in response to a failure of one or more components. As another example, chaos engineering principles can be used to identify the tipping point(s) at which a system would fail to provide adequate service in response to one or more failures or faults in the system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
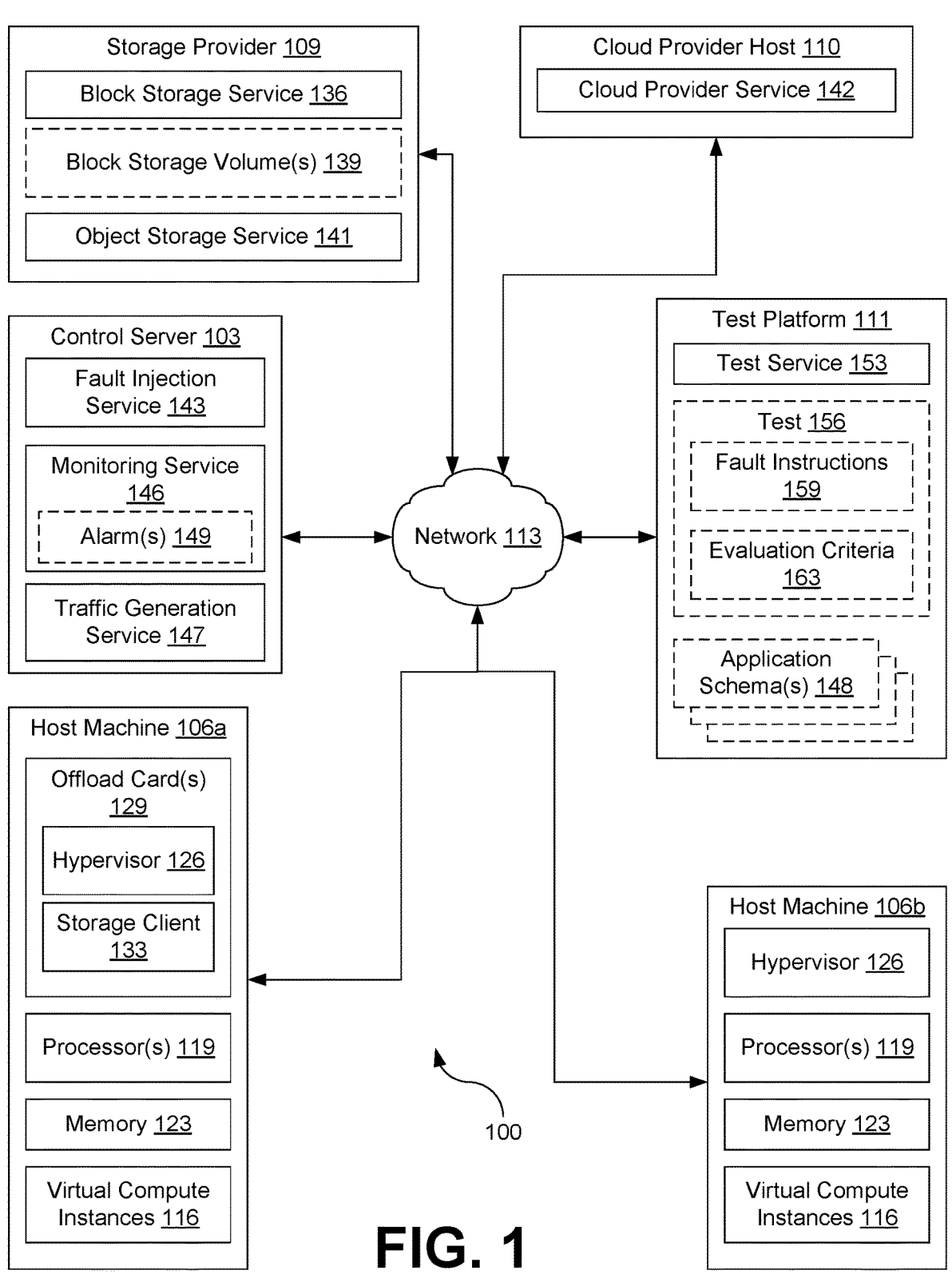
FIG. 1 is a schematic block diagram of a cloud provider network according to various embodiments of the present disclosure.

Although chaos engineering principles are often used to identify the impact of faults or failures within a system, some faults or failures only present themselves within the system, or only have a noticeable or perceptible impact on the system, when the system is placed under load. Some of these faults or failures may be metastable faults or failures, wherein the fault or failure continues to exist within the system after the trigger for the metastable fault or failure is removed, such as when the system is no longer under load. Other faults or failures may be non-metastable, where the fault or failure resolves itself or otherwise disappears after the trigger for the non-metastable fault or failure is removed, such as when the system is no longer under load.

Metastable faults or failures often result from an unforeseen or unintended feedback loop that is usually associated with the exhaustion of one or more resources. For example, often times retrying failed requests is done to resolve transient issues in a system (e.g., temporary network congestion or system load). However, retrying failed requests can result in increasing load on a system as failed requests are retried while new or incoming requests are simultaneously processed, resulting a new, steady state of requests that overloads the system. Once overloaded, the system will continue to remain overloaded as failed retry requests result in additional retry requests that will eventually fail due to the load on the system. The system could remain in this metastable fault or failure state indefinitely. As another example, failover systems can cause metastable faults or failures. When a first instance of a system resource (e.g., a database, block storage service, object storage service, web service, application service, etc.) fails and becomes unavailable, a failover system can reroute requests to the first instance of the system resource to the second instance of the system resource. This can cause cascading failures by rerouting the requests or network traffic that caused the first instance of the system resource to fail over to the second system resource. Failures can continue to cascade as previously failed system resources are restored the failover system reroutes the requests back to the restored systems from the currently unavailable secondary or redundant system resources. Although these examples illustrate the concept of a metastable fault or failure, other types of scenarios can result in a metastable fault or failure of a system, service, or application.

Non-metastable faults or failures often result from unforeseen behaviors when a system is operating at load. As an illustrative example of a non-metastable fault or failure would be database connections issues that are masked by a cache. Due to caching, connection issues with a database may not be apparent when only a few requests are made to a system, service, application, etc. because responses could be prepared using resources located in the cache for the database. However, when a system is under load and responding to a large number and/or a wide variety of requests, cache misses could occur because the cache may not include all of the resources necessary to respond. Therefore, requests may be made to the database itself to prepare responses and unknown or unidentified connection issues with the database would then become apparent.

Integrating load testing with chaos engineering tests or experiments allows for both metastable and non-metastable faults or failures to be identified that would not be previously identifiable or detectable when load testing or chaos engineering testing were used separately. This may be analogous to integrating different types of testing on automobiles within a wind tunnel. A wind tunnel could be used to test the performance and resiliency of a windshield on an automobile travelling at sixty miles per hour (60 mph) in order to verify that the windshield is safe for passengers while the automobile is travelling at highway speeds. Meanwhile, one could throw small pebbles at the windshield to verify that the windshield can withstand impacts from small objects. However, only by combining the two tests into a single test to simulate road debris, where a small pebble is launched at 60 mph into the windshield, could one uncover a critical design defect where the windshield is prone to shattering when road debris hits the automobile windshield while the automobile is travelling at highway speeds. Similarly, integrating multiple types of tests together would uncover otherwise unobservable errors.

Accordingly, various embodiments of the present disclosure allow for systems, services, or applications ("test targets") to be place under load as part of a chaos engineering or fault injection test or experiment. For instance, a fault injection service may determine what level of activity constitutes a load or stress on the test target. The fault injection service could then cause a traffic generation service to send sufficient traffic to the test target to place the test target under load. Once under load, the fault injection service could then begin causing faults to occur within the test target to identify potential failures or failure points. The fault injection service can further evaluate the operation of the test target to determine which errors or failures are the result of the test target being under load versus the result of faults or failures being intentionally introduced within the test target.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

FIG. 1 illustrates a cloud provider network 100 according to various embodiments of the present disclosure. The cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network 100, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network 100 to provide low-latency resource access to customers on a global scale with a high degree of fault tolerance and stability.

The cloud provider network 100 can be used to provide cloud computing services to end users. With cloud computing, instead of buying, owning, and maintaining their own data centers and servers, organizations can acquire technology such as compute power, storage, databases, and other services on an as-needed basis. The cloud provider network 100 can provide on-demand, scalable computing platforms to users through a network, thereby allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The traffic and operations of the cloud provider network 100 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers 103. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Accordingly, the cloud provider network 100 can include a number of components. For example, the cloud provider network 100 could include a control plane that includes one or more control servers 103. The could provider network 100 could also include one or more host machines 106a, 106b, etc. (collectively referred to as "host machines 106"), a storage provider 109, one or more cloud provider hosts 110, and one or more test platforms 111.

All of these components can be in data communication with each other via a network 113. The network 113 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The control server 103 can represent one or more servers that implement or provide control plane operations over the logical control plane of the cloud provider network 100. To assist in the implementation of control plane operations, the control server 103 may implement various control services. These control services can provide an administrative interface for configuring the operation of individual components of the cloud provider network 100, such as configuring one or more host machines 106 to provide the resources requested by a user of the cloud provider network 100. As an example, the control services hosted by the control server 103 may provide a mechanism that allows users to allocate or modify the resources consumed by the user of the cloud provider network 100. This can include instantiating or modifying computing, networking, or storage resources provided by the cloud provider network 100. For instance, the control server 103 could implement user commands to create, modify, or terminate virtual machines hosted by cloud provider network 100, assign storage to virtual machines, create pools of shared storage, etc.

One or more host machines 106 may also be present in the cloud provider network 100. Each host machine 106 can provide an operating environment for one or more virtual compute instances 116. In addition, each host machine 106 can include one or more processors 119 and memory 123, which can be allocated to individual ones of the virtual compute instances 116. Moreover, a host machine 106 can have a hypervisor 126 installed to manage and coordinate the execution of any virtual compute instances 116 hosted by the host machine 106. The host machines 106 could be deployed, for example, as a part of an elastic cloud service (referred to in various implementations as an elastic compute service, a virtual machines service, a computing cloud service, a compute engine, or a cloud compute service).

The cloud provider network 100 may offer virtual compute instances 116 (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances 116 may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well.

Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It will be appreciated that such virtualized compute instances 116 may also be able to run in other environments, for example on the premises of customers, where such on-premise instances may be managed by the cloud provider or a third party. In some scenarios, the virtual compute instances 116 may be micro-virtual machines (microVMs). The cloud provider network 100 may offer other compute resources in addition to instances and microVMs, such as containers (which may run in instances or bare metal) and/or bare metal servers that are managed by a portion of a cloud provider service running on an offload card of the bare metal server.

The hypervisor 126, also known as a Virtual Machine Manager (VMM), allows multiple virtual compute instances 116 (e.g., virtual machines) to run on and share the same underling hardware. Each operating system created by and run/controlled by the hypervisor 126 is called a domain or guest OS, and the hypervisor's operating system, if any, is called the host OS. The hypervisor exists outside of a guest OS to intercept the commands sent to the computer hardware.

In some embodiments, the execution of virtual compute instances 116 is supported by hypervisor 126 in the role of a lightweight virtual machine manager (VMM). These lightweight VMMs enable the launch of lightweight microVMs in non-virtualized environments in fractions of a second. These lightweight VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host machine 106. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

In some implementations, customers of a cloud provider can deploy containers by managing clusters of virtual compute instances 116 that run container agents. In such implementations, customers manage scaling, monitoring, patching, and security of the virtual compute instances 116, in addition to managing their containerized workload. In some implementations, customers of a cloud provider may deploy and scale containerized workloads automatically without having to manage the underlying computing resources, for example via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of virtual compute instances 116 on behalf of the customer.

In some implementations, at least a subset of virtualization management tasks may be performed at one or more offload cards 129 so as to enable more of the processing capacity of the host machine 106a to be dedicated to client-requested compute instances—e.g., cards connected via PCI or PCIe to the physical CPUs 119 and other components of the virtualization host may be used for some virtualization management components. Such an offload card 129 of the host machine 106 can include one or more CPUs that are not available to customer instances, but rather are dedicated to instance management tasks such as virtual machine management, input/output virtualization to network-attached storage volumes, local migration management tasks, instance health monitoring, and the like.

For example, a host machine 106a could use the CPUs of the offload card 129 to execute the hypervisor 126 managing the virtual compute instances 116 on the host machine 106a. This would be in contrast to a host machine 106b, where a hypervisor 126 consumes at least some of the resources of the processors 119 and memory 123 of the host machine 106b that would otherwise be available to the virtual compute instances 116 hosted on the host machine 106b.

As another example, a host machine 106a could execute storage client 133. The storage client 133 may be implemented on an offload card 129 that is connected to and controls the host machine 106a that includes the processing units (e.g., CPUs or GPUs) of the compute instance. The elastic block store client 133 represents instructions that enable a virtual compute instance 116 to connect to, and perform I/O operations at, a remote data volume (e.g., a data volume stored on a physically separate computing device accessed over a network), such as data storage provided by the storage provider 109. For example, the storage client 133 could communicate with a block storage service 136 hosted by the storage provider 109 to create an attachment between one or more block storage volumes 139 and one or more virtual compute instances 116 hosted on the host machine 106a. An attachment between an block storage volume 139 and a virtual compute instance 116 refers to the establishment of a connection between the virtual compute instance 116 and the block storage volume 139 made by the storage client 133. This connection may be referred to as a "lease" in some implementations, and it enables the virtual compute instance 116 to view the block storage volume 139 as if it were a local storage drive, even though the block storage volume 139 and the virtual compute instance 116 may be hosted on different physical machines and communicating over a network.

A block storage service 136 (referred to in various implementations as a cloud disks service, a managed disk service, a cloud block storage service, storage area network (SAN) service, a persistent disk service, a block volumes service, etc.) can be executed to provision and manage block storage volumes 139. The block storage volumes 139 can represent raw, block-level storage provided by the block storage service 136 that can be attached to a virtual compute instance 116 through an EBS attachment created by an storage client 133. A range of possible block storage volumes 139 may be provided or offered by the block storage service 136, such as solid-state drive (SSD) backed volumes that offer low-latency response times for random IO or disk-backed volumes that provide low-cost or high-through-put storage.

The storage provider 109 can also host an object storage service 141. An object storage service 141 can be executed by the storage provider 109 to provide an object store that manages data as objects. Each object stored in the object storage service 141 can include data about itself and a globally unique identifier that distinguishes the object from other objects stored by the object storage service 141. Due to the object-based nature of the object storage service 141, users can often store large amounts of unstructured data in a cost-effective manner. The object storage service 141 can offer object storage, access, and retrieval through the network 113 (e.g., through the use of a web or network-based API). Examples of Object storage services 141 can include AMAZON WEB SERVICES S3, MICROSOFT AZURE BLOB STORAGE, GOOGLE CLOUD STORAGE, and RACKSPACE FILES.

One or more cloud provider host(s) 110 can be in the cloud provider network 100 to host and provide various cloud provider services 142 to customers, users, and consumers of the cloud provider network 100. Cloud provider host(s) 110 can include both bare-metal and virtual machines, which can host individual instances of cloud provider services 142.

Cloud provider services 142 can include any network accessible service that provides functionality that could be used by a virtual compute instance 116 or an application hosted by a virtual compute instance 116. Examples of cloud provider services 142 include network services such as managed databases (e.g., relational databases, key-value stores, etc.), domain name service (DNS) servers, function-as-a-service platforms (e.g., AMAZON AWS LAMBDA, GOOGLE CLOUD FUNCTIONS, MICROSOFT AZURE FUNCTIONS, APACHE OPENWHISK, etc.), software as a service platforms (e.g., hosted applications), etc.

One or more of these resources can be combined together to form an application that provides a service or other functionality to a user. A simple application could include a virtual compute instance 116 that hosts a web server and makes use of an elastic block storage volume 139 to store files for a website. An application could also make use of one or more services made available by a cloud provider service 142, such as a database, to store searchable content or data used by the website. More complicated applications could make use of additional resources, such as multiple virtual compute instances 116 performing various functions spread across multiple hosts 106 and utilizing various resources made available through one or more cloud provider services 142, with data being stored using the object storage service 141 and/or using one or more elastic block storage volumes 139. In many instances, an application may be described, defined, or represented using an application architecture schematic file, which can define the application's architecture schema by identifying the components of the application and illustrating or specifying the dependencies of, relationships between, or interactions with the components of the application.

A control server 103 can execute one or more services that interact with the previously described components of the cloud provider network 100. These services can include a fault injection service 143, a monitoring service 146, and a traffic generation service 147. In some implementations, however, the traffic generation service 147 could be alternatively hosted by or executed by the test platform 111. While reference numeral 143 is referred to herein primarily as the fault injection service, in some implementations 143 may be considered as a fault injection orchestrator, while the test service 153 may be considered as the fault injection service.

The fault injection service 143 can be executed to create or introduce unexpected or unplanned failures or errors into a system hosted by the cloud provider network 100. Generally, the fault injection service 143 can introduce a fault specified by a user or owner of the cloud provider network 100 resource(s) to be tested. This could be singular fault that will last for a predefined duration of time, or a series of faults that are introduced in series or parallel as part of a larger experiment. Because the fault injection service 143 is hosted on a control server 103 that is a component of the logical control plane of the cloud provider network 100, the fault injection service 143 can communicate directly with the host machines 106, offload cards 129, storage provider 109, or network 113 to introduce faults. In contrast, customer or user installed agents executing on customer virtual compute instances 116 may be unable to access the underlying hardware (e.g., host machines 106) or services of the cloud provider network 100 to introduce faults for system or application testing purposes.

There are many different types of faults that could be introduced into the cloud provider network 100 by the fault injection service 143. As an illustrative example, the fault injection service 143 could send a command to the hypervisor 126 that instructs the hypervisor 126 to alter (e.g., reduce or otherwise throttle) the processor(s) 119 or memory 123 resources made available to a specified virtual compute instance 116. This could include altering the amount of processor 119 cycles made available to the virtual compute instance 116. For example, the number of processor 119 cycles could be reduced to simulate resource contention for the processor 119 of the host machine 106. This could also include altering (e.g., reducing) the amount of memory 123 made available to the specified virtual compute instance 116 to simulate resource contention for the memory 123 of the host machine 106. In a similar example, the fault injection service 143 could send a command to the hypervisor 126 that instructs the hypervisor 126 to alter (e.g., reduce) the network bandwidth available to the specified virtual compute instance 116 to simulate a congested connection to the network 113. Likewise, the fault injection service 143 could send a command to the hypervisor 126 that instructs the hypervisor 126 to drop a specified percentage of packets sent from or destined for the specified virtual compute instance 116 to simulate a congested connection to the network 113. The fault injection service 143 could also send a command to the hypervisor 126 that instructs the hypervisor 126 to delay delivery of a specified number or percentage of packets sent from or destined for the specified virtual compute instance 116 by a specified amount of time to simulate latency in the connection with the network 113. As another illustrative example, the fault injection service could send a command to the storage client 133 to drop or delay packets sent to or received from a specified block storage volume 139 attached to the specified virtual compute instance 116, which could have the effect of simulating an IO resource bottleneck. Similarly and alternatively, the fault injection service 143 could send a command to the block storage service 136 to delay responses or refuse to respond to IO requests for a specified block storage volume 139. This could also have the effect of simulating an IO resource bottleneck.

The fault injection service 143 can also cause more catastrophic faults to be simulated, such as service outages within the cloud provider network 100. For example, the fault injection service 143 could send a command to a hypervisor 126 to terminate or power-off one or more virtual compute instances 116 hosted on the host machine 106. As a similar example, the fault injection service 143 could send a command to the hypervisor 126 to drop all network traffic destined for or sent by the specified virtual compute instances 116. In either situation, the apparent effect would be that one or more host machines 106 (e.g., individual servers, individual data centers, or individual regions or availability zones) had become unavailable due to some sort of service, hardware, or network outage.

The fault injection service 143 can also be executed to identify or determine a load level of traffic for a system, service, or application to be tested by the fault injection service 143. The load level of traffic represents the amount of traffic necessary for a system, service, or application to be operating at or near full capacity. For example, if a system, service, or application had a maximum capacity to perform 100,000 operations or actions per second, the load level of traffic would be the amount of traffic needed to cause the system, service, or application to perform ~100,000 operations or actions per second.

The monitoring service 146 can be used to receive monitoring data, events, or notifications from virtual compute instances 116, Storage clients 133, hypervisors 126, the elastic block storage service 136, network devices, or applications hosted using the various resources of the cloud provider network 100. The monitoring service 146 can also receive monitoring data, events, or notifications from third-party services. The monitoring service 146 can then surface information to users regarding the performance or utilization of their applications or the resources assigned to their applications. An example of a monitoring service 146 is AMAZON CLOUDWATCH, although similar services also exist.

For example, the monitoring service 146 could receive periodic reports (e.g., every minute, every fifteen (15) minutes, every hour, etc.) from host machines, hypervisors 126, applications hosted by virtual compute instances 116, the storage provider 109, the elastic block storage service 136, etc. The monitoring service 146 could then determine whether or not an alarm 149 had been triggered. If the alarm 149 had been triggered, the fault injection service 143 could be notified, causing any fault introduced by the fault injection service 143 to be reversed. An alarm 149 can represent a user or customer created rule that, when triggered, sends a notification to a specified target, such as the fault injection service 143. However, in some instances, the monitoring service 146 could also use machine-learning techniques to suggest or create its own alarms 149.

Moreover, the monitoring service 146 could receive periodic reports from third-party services that provide additional information that could be used as the basis for an alarm 149. For example, the monitoring service 146 could be configured to subscribe to, or receive periodic reports from, a ticket or defect tracking service (e.g., JIRA), a status indicator, a service-level agreement (SLA) monitor, or various social media platforms that provide public access (e.g., TWITTER, REDDIT, MASTODON, etc.). User created or machine-learning created alarms 149 could also be created to trigger based on the data received from the ticket or defect tracking service, status indicator, SLA monitor, or social media platforms.

The traffic generation service 147 can be executed to send traffic to a system, service, or application to cause it to operate at or near load. For example, the fault injection service 143 or the test service 153 could send a command to the traffic generation service 147 to send traffic to the system, service, or application equal to the load level of traffic. The traffic generation service 147 could then send a load level of traffic until instructed by the fault injection service 143 or the test service 153 to cease sending traffic.

The test platform 111 can represent any physical or virtual host that can execute or otherwise implement the test service 153. While depicted separately for the purpose of clarity, the test platform could be implemented as a virtual compute instance 116 on one or more most host machines 106 within the cloud provider network 100, or as a physical (e.g., "bare-metal") computing device within the cloud provider network 100. Also, one or more application schemas 148 can also be stored on or by the test platform 111 for use with the test service 153 (e.g., to provide to the fault injection service 143, monitoring service 146, and/or traffic generation service 147).

The application schemas 148 represent the architecture of respective applications 200. Each application schema 148 can include information about the components and/or dependencies of an application 200, such as the number and type of virtual compute instances 116, cloud provider services 142, object storage services 141, elastic block storage volumes 139, and other services or systems that are used to deploy an application 200. Moreover, an application schema 148 can specify the relationships between the components and/or dependencies.

The test service 153 can be implemented to execute and analyze the results of one or more tests 156. Accordingly, the test service 153 could invoke the fault injection service 143 to introduce faults in various components of the cloud provider network 100, as specified in one or more fault instructions 159 of a test 156. Similarly, the test service 153 could also receive messages from the monitoring service 146 regarding the impact or effect of a fault introduced by the fault injection service 143 to determine whether a test 156 passed or failed according to one or more evaluation criteria 163. In order to measure to determine how an application 200 will respond to a test 156 performed when the application 200 is under load, the test service 153 could also invoke the traffic generation service 147 to send sufficient network traffic or application programming interface (API) requests to the application 200 to place the application 200 under load.

A test 156 can represent a fault or series of faults to be introduced into cloud provider network 100 in order to test, analyze, or evaluate how the cloud provider network 100, or virtual compute instances 116 within the cloud provider network 100 or applications that are hosted by or rely upon the services provided by the cloud provider network, would react in response to the occurrence of the faults. Accordingly, a test 156 can specify one or more fault instructions 159 to use to conduct the test 156 and one or more evaluation criteria 163 to determine whether the test 156 is passed or failed. The test 156 can also specify a recipient for notifications regarding whether the test 156 is passed or failed.

Fault instructions 159 can specify the type of fault to be introduced into the cloud provider network 100, the duration of the fault, the target of the fault, one or more fault parameters that specify how the fault is to be cause or implemented, and potentially other information. The target of the fault can represent the service, system, or application that will be implementing the fault, as further discussed. The additional information could, for example, identify which of the virtual compute instance(s) 116 are to be faulted.

Evaluation criteria 163 can represent the criteria used to determine whether a test 156 is passed or failed. In simple tests 156, a single evaluation criterion 163 may be present. However, comprehensive tests can include multiple evaluation criteria 163. Different types of evaluation criteria 163 can also be used, depending on the type of data to be analyzed to determine whether a test 156 passes or fails and based on how success or failure of the test 156 is defined.

In some implementations, the evaluation criteria 163 can specify one or more alarms 149, which may have been specially created for the purpose of evaluating the results of the test 156. If one or more of the alarms 149 are triggered, the test 156 could be deemed to have failed. If none of the alarms 149 are triggered, the test could be deemed to have passed. The use of alarms 149 can be useful to determine whether a particular fault will have a measurable, technical impact on performance of the virtual compute instances 116 or applications hosted using the virtual compute instances 116.

In other implementations, the evaluation criteria 163 could include one or more instances of executable code that could be executed to analyze one or more components or parameters of the cloud provider network 100 to determine whether the test 156 passed or failed. In these implementations, the executable code could be evaluated by any appropriate runtime environment. In some instances, a copy of the executable code itself could be included in the evaluation criteria 163. In other instances, the network address or location of the executable code could be specified, as well as any arguments required for the executable code. For example, the executable code could include a package or container that includes or specifies one or more tasks or functions to be performed. This container could be pre-provisioned with an event-driven, serverless computing platform, which can execute the package or container in response to receiving a notification of an event occurring. Such platforms may be referred to as "function as a service (FaaS)" platforms (e.g., AMAZON AWS LAMBDA, GOOGLE CLOUD FUNCTIONS, MICROSOFT AZURE FUNCTIONS, APACHE OPENWHISK, etc.). An example of an event that could serve as a trigger for execution of the code could be initiation or completion of the test 156.

Executable code could be used as an evaluation criterion 163 for a number of reasons. For example, the executable code could be used in order to access data or platforms outside of the cloud provider network 100. As another example, the executable code could be used in order to evaluate performance metrics that are not captured or recorded by the monitoring service 146. For instance, a test 156 may pass if an operations center responds to a fault in less than a predefined amount of time. Accordingly, executable code could be used to determine whether a member of the operations center undertook some action within the predefined amount of time.

Figure 2:
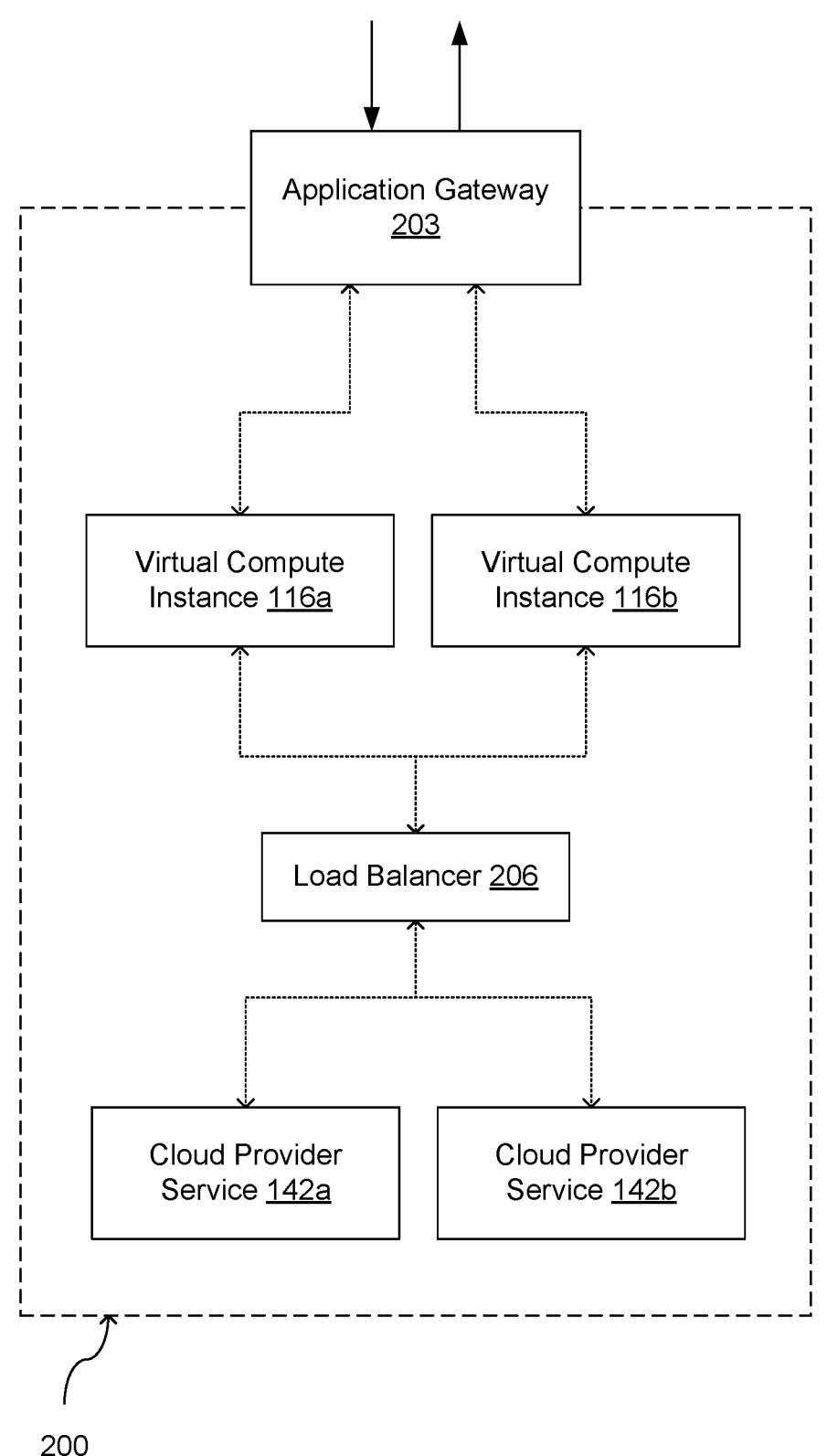
FIG. 2 is a schematic block diagram of an application deployed within the cloud provider network of FIG. 1 according to various embodiments of the present disclosure.

FIG. 2 illustrates a simple example of an application 200 that could be hosted within the cloud provider network 100. Although the application 200 of FIG. 2 merely illustrates one architecture of an application 200, it should be noted that other architectures for an application 200 could also be deployed within the cloud provider network 100. The various embodiments of the present disclosure would work with any application 200, regardless of its particular architecture.

The application 200 can have a number of components. For example, the application 200 could include an application gateway 203, which acts as destination for network traffic to the application 200. Accordingly, the application gateway 203 operates as both an ingress point and/or an egress point for network traffic sent to the application 200 or sent from the application 200. The application gateway 203 could perform a number of traffic routing functions, such as load-balancing between virtual compute instances 116 (e.g., virtual compute instance 116a and virtual compute instance 116b) configured to handle requests sent to the application 200 or other routing functions. The virtual compute instances 116 could make use of a cloud provider service 142. In order to spread the load, the virtual compute instances 116 could be connected to a load balancer 206 assigned to the application 200. Requests to the cloud provider service 142 from a virtual compute instance 116 could be sent to the load balancer 206, which would route the request to either the cloud provider service 142a or the cloud provider service 142b using one of various load balancing techniques.

In some instances, a virtual compute instance 116 of one application 200 could also be in data communication with another application 200. For example, an application 200 for a video streaming service could have a virtual compute instance 116 that has a data connection to a billing application 200. These types of connections could cause a test 156 performed on one application 200 to unexpectedly impact another application 200.

Figure 3:
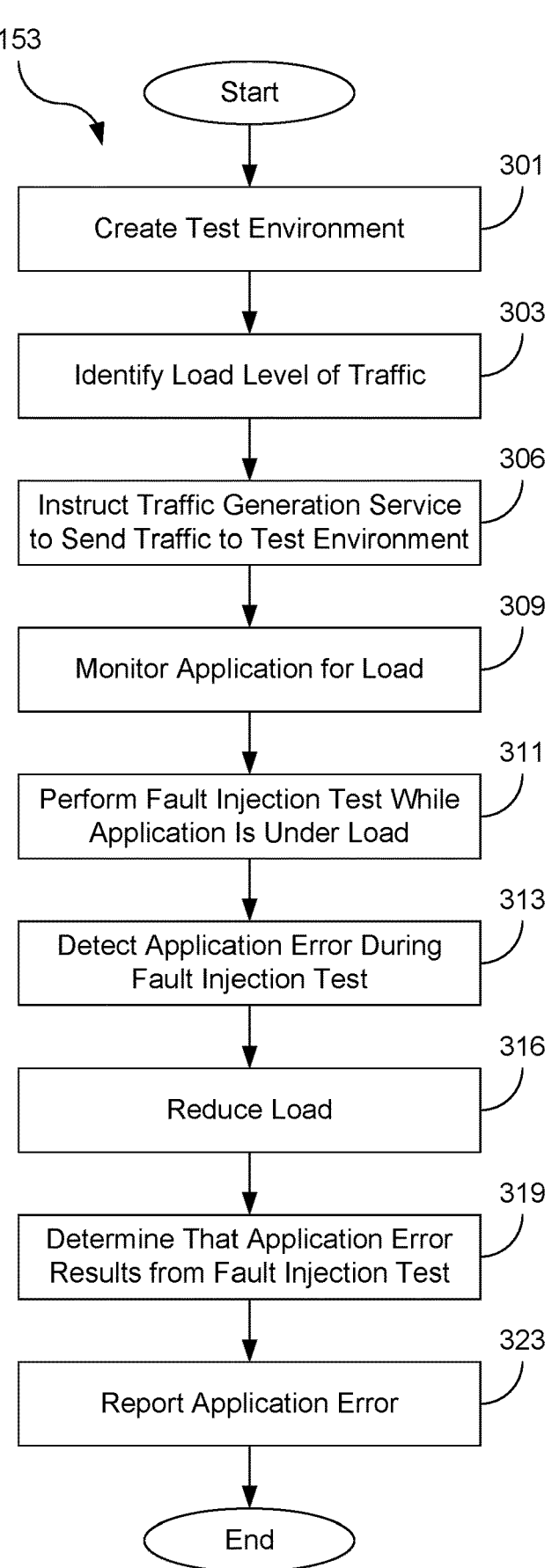
FIG. 3 is a flowchart illustrating one example of functionality implemented within the cloud provider network of FIG. 1 according to various embodiments of the present disclosure.

Referring next to FIG. 3, shown is a flowchart that provides one example of the operation of a portion of the test service 153. The flowchart of FIG. 3 provides merely an example of the many different types of functional arrangements that can be employed to implement the operation of the depicted portion of the test service 153. As an alternative, the flowchart of FIG. 3 can be viewed as depicting an example of elements of a method implemented within the could computing environment 100.

Beginning at block 301, the test service 153 can create a test environment for an application 200. This could be done, for example, in response to receiving a command or instruction to perform a test 156 on the application 200. In some instances, the test environment could be a created by duplicating the existing application 200 and its dependencies and allocated resources, which are sometimes referred to as a shadow copy or shadow environment of the application 200. The test 156 could then be performed on the application 200 itself. If any significant or uncorrectable errors were to occur, the state of the application 200 could be restored by copying the shadow copy or shadow environment to recreate the application 200. This would allow for the test 156 to be performed on the live or production version of the application 200. However, in other instances, the test 156 could be performed on the shadow copy or shadow environment. This allows for test 156 to be performed without impacting the production version of the application 200.

Subsequently at block 303, the test service 153 can determine the load level of traffic for the application 200. This can be done using a variety of approaches and techniques.

In a first approach, the test service 153 can analyze application logs of the application 200 to identify load signals, which are indicators that the traffic sent to the application 200 is currently sufficient to place the application 200 under load. One example of a load signal are errors which appear or present as the amount of traffic to the application 200 increases, but disappear as the amount of traffic to the application 200 decreases. Another example of a load signal could include the maximum amount of traffic identified in the application logs. For example, if the amount of traffic received by the application 200 never crosses a particular threshold identified in the logs, that could indicate that the identified amount of traffic is the maximum load that the application 200 can handle. In some implementations, the test service 153 could use various machine learning techniques to identify potential load signals based at least in part on the application logs.

In a second, similar approach, the load level could be determined based at least in part on when one or more alarms 149 are triggered. For example, one or more alarms 149 could be set to trigger based on various criteria that would indicate that the application 200 is under load. The test service 153 could analyze one or more application logs to determine what the traffic levels to the application 200 were when the monitoring service 146 reported the alarm(s) 149 as being triggered.

In a third approach, the load level could be provided to the test service 153. For example, the load level could be specified in a test 156. For example, one of the fault instructions 159 could specify the load level to be used for the test 156. In these embodiments, the test 156 could contain multiple fault instructions 159 that specify different load levels for the application 200. For example, the test 156 could specify a first load level that places the application 200 at fifty percent (50%) load, a second load level that places the application 200 at ninety percent (90%) load, and a third load level that places the application 200 at one-hundred percent (100%) load. These embodiments could be used to allow a test 156 to be performed that evaluates the ability of an application 200 to be able to respond to faults under different loads.

Then, at block 306, the test service 153 can send an instruction to the traffic generation service 147 to send an amount of traffic to the application 200 that matches the load level of traffic. In some implementations, the test service 153 could further provide an application schema 148 for the application 200 to the traffic generation service 147 to allow the traffic generation service 147 to determine the type of network traffic to send to the application 200. The operation of the traffic generation service 147 to place the application 200 under load is further detailed in FIG. 4.

Moving on to block 309, the test service 153 can monitor the application 200 to determine whether it is under load. This can be done using a variety of approaches. For example, the application 200 could have one or more alarms 149 set that, when activated, indicate that the application 200 is under load. The monitoring service 146 could report to the test service 153 when one or more of these alarms 149 are triggered, thereby notifying the test service 153 that the application 200 is currently under load. As another example, the test service 153 could monitor application or traffic logs associated with the application 200 while the traffic generation service 147 is sending traffic to the application 200. When the test service 153 identifies load signals within the application or traffic logs, then the test service 153 could determine that the application 200 is currently under load. The test service 153 could use machine learning or other techniques to determine whether the load signals are present in the application or traffic logs.

In some implementations, the test service 153 could wait for a predefined period of time (e.g., 20-30 minutes) after initially detecting that the application 200 is under load to determine if the application 200 remains under continuous load. To determine whether the application 200 remains under continuous load, the test service 153 could monitor the alarms 149 to determine if they remain activated or could monitor application or traffic logs to determine whether the load signals continue to remain present in the logs during the predefined period of time. If the test service 153 determines that the application 200 remains under continuous load, then the process could proceed to block 311. Otherwise, the test service 153 could continue to monitor the application 200 as previously described for block 309.

In these implementations, the test service 153 could wait until the application 200 is under load for a predefined amount of time before proceeding to block 311 for a number of reasons. For example, it may be necessary to preload the application 200 in order for resources allocated to the application 200 (e.g., caches, connection pools, network bandwidth, processor or memory allocations to virtual compute instances 116 by host machines 106, etc.) to be fully utilized or consumed. This process of preloading the application 200 may be referred to as synchronizing the application 200 load with the test 156 or the fault instructions 159 of the test 156.

Proceeding to block 311, the test service 153 can send the fault instructions 159 to the fault injection service 143. This can cause the fault injection service 143 to begin injecting or otherwise causing or introducing the specified faults into the application 200. This can be done after the test service 153 has determined at block 309 that the application 200 is under load in order to allow the test service 153 to evaluate how the application 200 responds to faults when it is under load. As previously described above in the discussion related to block 309, this could also be performed after a predefined period of time has elapsed in order to preload the application 200 prior to introducing faults.

Next, at block 313, the test service 153 can detect application errors, such as metastable faults or non-metastable faults, that occur while the fault injection service 143 is injecting or otherwise causing or introducing faults into the application 200. For example, the test service 153 could receive alerts from the monitoring service 146 that one or more alarms 149 had triggered. As another example, the test service 153 could analyze one or more application or traffic logs related to the application 200 to identify any application errors.

Moving on to block 316, the test service 153 could reduce the load placed on the application 200 in response to detecting the application errors. For example, the test service 153 could send a command or instruction to the traffic generation service 147 to halt the sending of network traffic. As another example, the test service 153 could send a command or instruction to the traffic generation service 147 to reduce the amount of network traffic being sent to the application 200 by a specified amount (e.g., 5%, 10%, 25%, 50%, etc.) or incrementally. In those examples where the test service 153 sends a command to the traffic generation service 147 to incrementally reduce the amount of network traffic sent to the application 200, the test service 153 could loop back to blocks 313 through blocks 316 to determine if any application errors are detected at the incrementally reduced load level. If further errors are detected, then the test service could send another command to the traffic generation service 147 to incrementally reduce the amount of network traffic, and the test service 153 could again loop back to blocks 313 through 316 to determine if any application errors are detected at the incrementally reduced load level. This incremental approach could continue until no further application errors are detected.

Then, at block 319, the test service 153 can determine whether any detected application errors occurred as a result of the fault injection service 143 introducing or injecting faults while the application 200 is under load. This can be done using a variety of approaches. As one example, the test service 153 could determine whether any application errors that were detected prior to reducing the load on the application 200 at block 316 continued to be present after the load on the application 200 was reduced. The continued presence of application errors could indicate that one or more metastable errors have been identified. As another example, the test service 153 could analyze application or traffic logs for errors related to the application 200 that are separate or distinct from the errors that would appear or otherwise be present while the application 200 is under load. The test service 153 could use various machine learning models to make such a determination by comparing application or traffic logs for the application 200 while it is under load to application or traffic logs for the application 200 generated while the fault injection service 143 is introducing or injecting faults into the application 200. As a second example, the test service 153 could determine whether any alarms 149 were triggered while the fault injection service 143 was injecting, causing, or otherwise introducing faults that were not triggered when the application 200 was under load, but the fault injection service 143 was not operating.

Subsequently, at block 323, the test service 153 could report any application errors to the initiator of the test 156. For example, if an administrator, owner, or operator of the application 200 had submitted the test 156 or requested that the test 156 be executed, the results could be returned to the administrator, owner, or operator. This could be done, for example, by providing the results in a web page or other user interface rendered on the display of the client device (e.g., laptop, desktop, mobile device, etc.), which identifies the errors that were determined at block 316 to result from the test 156 being performed while the application 200 was under load. The results could also provide information about the types of errors that occurred and, in some instances, recommend fixes based on applications 200 with similar architectures or that have experienced similar errors previously.

Figure 4:
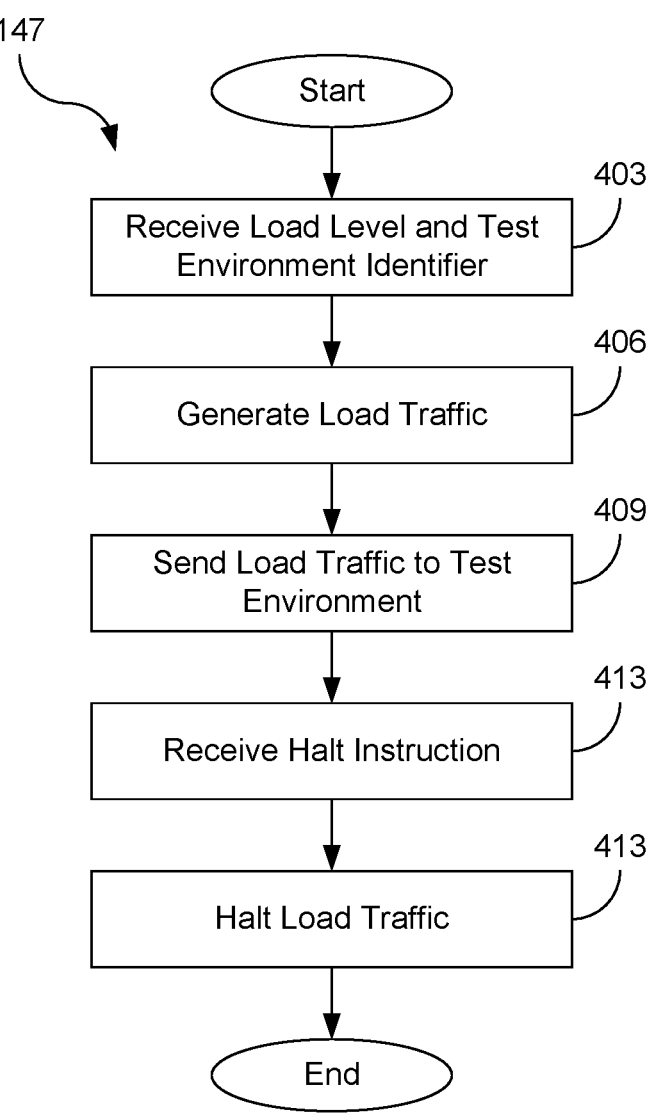
FIG. 4 is a flowchart illustrating one example of functionality implemented within the cloud provider network of FIG. 1 according to various embodiments of the present disclosure.

Referring next to FIG. 4, shown is a flowchart that provides one example of the operation of a portion of the traffic generation service 147. The flowchart of FIG. 4 provides merely an example of the many different types of functional arrangements that can be employed to implement the operation of the depicted portion of the traffic generation service 147. As an alternative, the flowchart of FIG. 4 can be viewed as depicting an example of elements of a method implemented within the cloud provider network 100.

Beginning with block 403, the traffic generation service 147 can receive the load level of traffic to send to an application 200 and the identifier of the test environment. For example, if the load level of traffic is to be sent to a production version of the application 200, then the identifier of the test environment could specify the production version of the application 200 as the recipient or destination of the load level of traffic. As another example, if the load level of traffic is to be sent to a shadow copy or shadow version of the application 200, then the identifier of the test environment could specify the shadow copy or shadow version of the application 200 as the recipient or destination of the load level of traffic.

Then, at block 406, the traffic generation service 147 can generate load traffic to send to the test environment (e.g., the version of the application 200 to be tested). Load traffic could be generated in a number of manners.

For example, the traffic generation service 147 could replay or resend previous network traffic destined for the application 200. This could be done by analyzing network or traffic logs and sending the traffic recorded in the network or traffic logs to the test environment (either by sending it to the shadow copy of the application 200 or by resending it to the production version of the application 200).

As a similar example, the traffic generation service 147 could generate synthetic network traffic. This could be done by using a machine-learning model to evaluate the network or traffic logs to identify typical or expected network requests and network traffic. The traffic generation service 147 could then use a generative machine-learning model to create network requests to the application 200 that are similar to the network requests recorded in the network or traffic logs. In some instances, the traffic generation service 147 could also evaluate an application schema 148 for the application 200 to identify application programming interface (API) calls that could be made to the application 200. In these instances, the traffic generation service 147 could receive the application schema 148 for the application 200 from the test service 153. The traffic generation service 147 could use the information about the API calls supported by the application 200 to create additional synthetic or artificial network requests or network traffic to the application 200.

In a third example, the traffic generation service 147 could set up a traffic mirror or load balancer to duplicate network traffic sent to the production version of the application 200 and forward the duplicate network traffic to the shadow version of the application 200. This could used in instances where the test 156 is performed on the shadow version of the application 200 rather than the production version of the application 200.

Next, at block 409, the traffic generation service 147 can cause the load traffic to be sent to the test environment. For example, once the traffic mirror or load balancer is configured, the traffic generation service 147 could activate or enable it. As another example, any synthetic network requests or traffic, or replay network requests or traffic, once generated, could be sent to the version of the application 200 to be tested.

Moving on to block 413, the traffic generation service 147 can receive a halt instruction from the test service 153. This could occur in response to an alarm 149 being triggered, the test 156 concluding, or some other criterion.

Subsequently, at block 416, the traffic generation service 147 can halt the load traffic being sent to the test environment.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system comprising:
a first set of computing devices including at least one first computing device, wherein the at least one first computing device of the first set of computing devices comprises:
at least one non-transitory machine-readable medium including machine-readable instructions; and at least one processor in communication with the at least one non-transitory machine-readable medium, wherein the at least one processor executes the machine-readable instructions to at least:
send load traffic to an application executed by a second set of computing devices;
receive, from the application, a load signal generated in response to the load traffic;
determine, while the load traffic is sent to the application and based on the load signal, that the application is operating at a load level, wherein the load level represents a threshold amount of traffic causing the application to operate at capacity;
while the application is operating at the load level, perform a fault injection test on the application while the application is operating at the load level;
determine, during performance of the fault injection test, that a metastable fault has occurred;
generate a corrective action to address the metastable fault; and
cause output of a report identifying the metastable fault.

2. The system of claim 1,
wherein to determine, during performance of the fault injection test, that a metastable fault has occurred, the at least one processor executes further machine-readable instructions to at least:
analyze one or more logs with a machine learning model, and
determine than an application error is a result of the fault injection test based on an output of the machine learning model, and
wherein the application error is unexpected when the application is under load.

3. The system of claim 1, wherein to identify the load level for the application, the at least one processor executes further machine-readable instructions to at least:
analyze, with a machine learning model, one or more logs associated with the application, and
identify, based on an output of the machine learning model, one or more load signals indicating when the application is under load.

4. The system of claim 1, wherein the at least one processor executes further machine-readable instructions to at least restore the application to a pre-test state in response to occurrence of the metastable fault.

5. A method comprising:
sending load traffic to an application;
receiving, from the application, a load signal generated in response to the load traffic;
determining, while the load traffic is sent to the application and based on the load signal, that the application is operating at a load level, wherein the load level represents a threshold amount of traffic causing the application to operate at capacity;

while the application is operating at the load level, performing a fault injection test on the application while the application is operating at the load level;

detecting, during performance of the fault injection test, an application error for the application while the application is operating at the load level; and generating a corrective action to address the application error.

6. The method of claim 5, further comprising incrementally reducing the load traffic sent to the application in response to detecting the application error during the fault injection test.

7. The method of claim 5, wherein the application error comprises a metastable fault.

8. The method of claim 5, further comprising reporting the application error.

9. The method of claim 5, wherein identifying the load level for the application further comprises analyzing an application log of the application to look for a load signal indicating that the application is operating at load the load level.

10. The method of claim 5, wherein the application is a test version of the application and sending load traffic to the application further comprises replaying network traffic sent to a production version of the application.

11. The method of claim 5, wherein sending load traffic to the application further comprises:

creating synthetic network traffic; and sending the synthetic network traffic to the application.

12. The method of claim 5, wherein the application is a test version of the application and sending load traffic to the application further comprises:

duplicating live network traffic sent to a production version of the application to generate duplicate network traffic; and sending the duplicate network traffic to the test version of the application.

13. A system comprising:

a first set of computing devices including at least one first computing device, wherein the at least one first computing device of the first set of computing devices comprises:

at least one non-transitory machine-readable medium including machine-readable instructions, and at least one processor in communication with the at least one non-transitory machine-readable medium, wherein the at least one processor executes the machine-readable instructions to at least:

create a shadow copy of an application executed by a second set of computing devices;

send load traffic to the application;

receive, from the application, a load signal generated in response to the load traffic;

determine, while the load traffic is sent to the application and based on the load signal, that the application is operating at a load level, wherein the load level represents a threshold amount of traffic causing the application to operate at capacity;

while the application is operating at the load level, perform a fault injection test on the application while the application is operating at the load level;

determine, during performance of the fault injection test, that an application error that is associated with the fault injection test occurred;

generate a corrective action to address the application error; and restore the application to a pre-test state based at least in part on the shadow copy of the application.

14. The system of claim 13, wherein to determine, during the performance of the fault injection test, that the application error occurred, the at least one processor executes further machine-executable instructions to at least:

analyze an application log during the fault injection test; and identify the application error in the application log.

15. The system of claim 13, wherein to determine, during the performance of the fault injection test, that the application error occurred, the at least one processor executes further machine readable instructions to at least determine that an alarm associated with the application has triggered during performance of the fault injection test.

16. The system of claim 13, wherein the at least one processor executes further machine-readable instructions to at least report the application error.

17. The system of claim 13, wherein the at least one processor executes further machine-readable instructions to at least identify the load level for the application.

18. The system of claim 13, wherein to send load traffic to the application, the at least one processor executes further machine-readable instructions to at least:

create synthetic network traffic; and send the synthetic network traffic to the application.

19. The system of claim 13, wherein the load traffic comprises a random value for a function call of an application programming interface (API) provided by the application.

20. The system of claim 13, wherein to determine that the application error that is associated with the fault injection test occurred, the at least one processor executes further machine-readable instructions to at least:

analyze one or more logs with a machine learning model; and determine from the analyzed one or more logs that the application error is unexpected when the application is under load.

\* \* \* \* \*